No. 784,256. PATENTED MAR. 7, 1905.
M. C. FLAHAVAN.
DUPLICATED CASH FARE RECEIPT.
APPLICATION FILED MAR. 7, 1904.
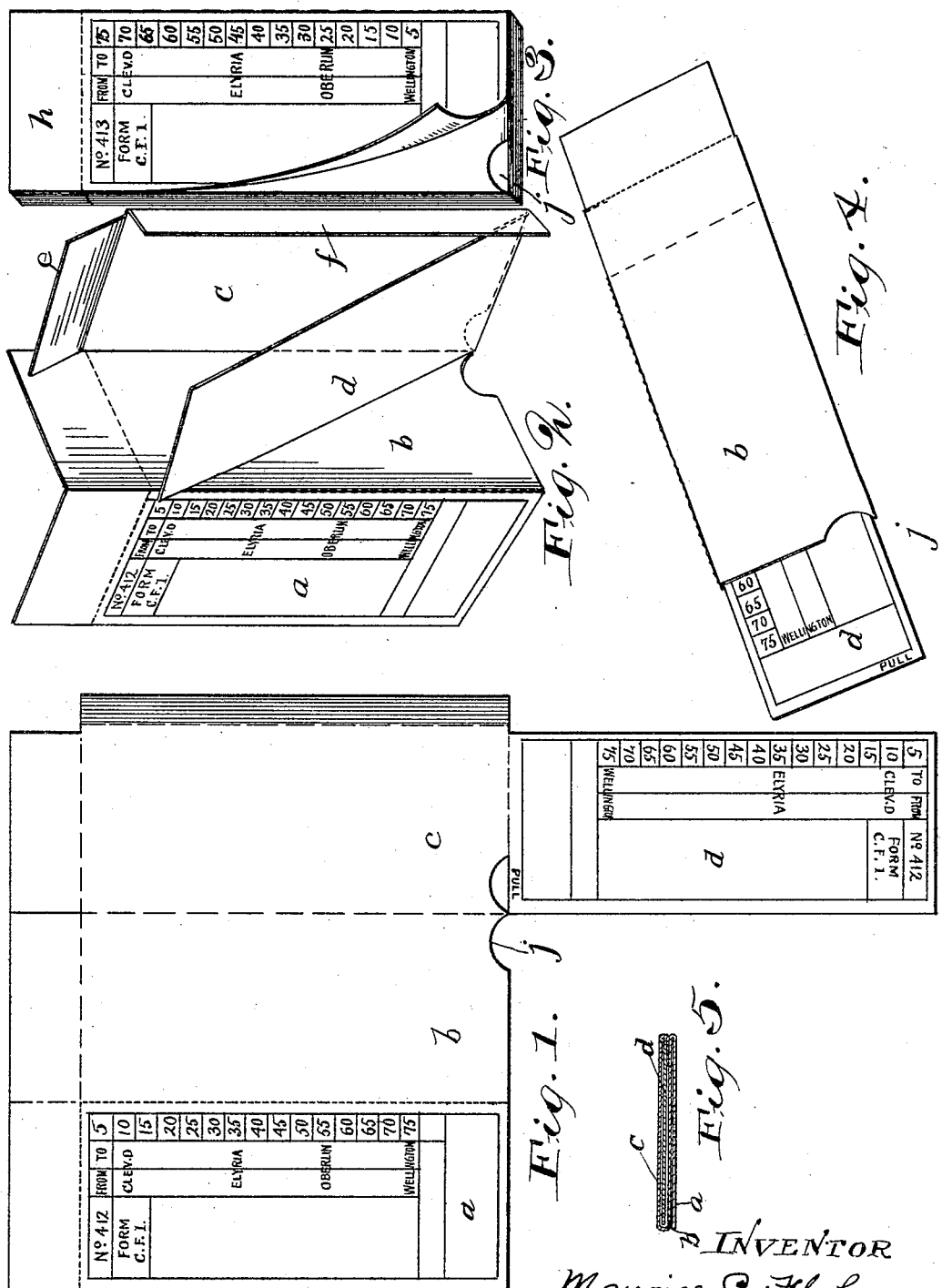
INVENTOR
Maurice C. Flahavan
By his attorneys,
Thurston & Bates
WITNESSES.
E. B. Gilchrist
J. B. Hull No. 784,256.

Patented March 7, 1905

UNITED STATES PATENT OFFICE.

MAURICE C. FLAHAVAN, OF CLEVELAND, OHIO.

DUPLICATED CASH-FARE RECEIPT.

SPECIFICATION forming part of Letters Patent No. 784,256, dated March 7, 1905.

Application filed March 7, 1904. Serial No. 196,849.

*To all whom it may concern:*

Be it known that I, MAURICE C. FLAHAVAN, a citizen of the United States, residing at Cleveland, in the county of Cuyahoga and State of Ohio, have invented a certain new and useful Improvement in Duplicated Cash-Fare Receipts, of which the following is a full, clear, and exact description, reference being had to the accompanying drawings.

The object of this invention is to compel railway conductors to pay over to their employers all of the money collected in payment of cash fares. One checking device which is in pretty general use in some form or another with this end in view is a so-called "duplicate cash-fare receipt." Each of these includes a receipt to be given to the passenger and a duplicate receipt to be turned over to the auditor, both of which receipts are punched simultaneously by the conductor at a point thereon which indicates the cash fare collected. One serious defect of these duplicated receipts as they have heretofore been constructed and used is that the duplicates, which the conductor retains in his possession until his run is completed, may be freely examined by him. He may compute from them just how much they require him to account for and pay over. In fact, that is the way a conductor ordinarily determines how much of the money in his possession he shall pay to the company. There are several reasons why this is objectionable. In the first place, if the conductor after he has collected a fare and before he punches his duplicate receipts is suddenly called upon to do something else—for example, to replace the trolley—he may when he has done this have honestly forgotten whether he punched the receipts therefor, or he may honestly believe that he did. When he comes to settling with the company at the end of the run, he is not charged on any auditor's check with the fare so collected and unrecorded, and therefore the company does not get it. All of such mistakes inure to the profit of the conductor. Moreover, when a conductor has found that he can through mistakes of this sort, honestly committed in the first instance, get possession of money which does not belong to him without much danger of being found out he is immediately subjected to temptation to do the same thing intentionally. Again, a dishonest conductor may tear off and punch the passenger's receipt and may afterward punch the auditor's check at a point indicating a smaller amount.

The duplicate cash-fare receipts constructed in accordance with my invention include a visible detachable passenger's receipt and an invisible auditor's check arranged in registering relation with the passenger-receipt, so that the conductor after he has punched the duplicate slips and has given the one part to the passenger cannot determine from what remains in his possession and open to his inspection what amount is punched from the auditor's check. Moreover, the visible receipts are not all alike, the differences being in the location thereon of the figures representing the various cash values. How many different varieties shall be employed depends upon circumstances and the individual notions of the managers of the railroads.

The invention whose characteristics are set forth above is shown in the drawings and hereinafter described, and pointed out definitely in the claims.

In the drawings, Figure 1 is a view of the blank sheet of paper before it is folded to form the duplicate receipts. Fig. 2 shows said blank partly folded. Fig. 3 shows a book or pad made up of a plurality of completed duplicate receipts, said receipts being held together by their stubs $h$. Fig. 4 is a view of what remains after the passenger's receipt has been torn off and after the inclosing envelop has been cut and the auditor's check partly withdrawn therefrom. Fig. 5 is a transverse sectional view through one of the completed duplicated receipts.

The blank shown in Fig. 1 is bent, as indicated in Fig. 2, to form four main folds $a$, $b$, $c$, and $d$ of substantially equal size. The three former are connected along their side edges; but the fold $d$ and fold $c$ are connected at their ends. The fold $a$, which constitutes the detachable passenger's receipt, has near one side edge thereof a row of figures indicating cash values. There may be other printed matter upon this fold; but such matter has nothing to do with the present invention. The fold $d$ has also similar value-indicating figures printed near one of its edges. The fold $d$ is first turned over onto the fold $c$; then a flap $e$, at the upper end of the fold $c$, is turned over onto the fold $d$; then a flap $f$, along the side edge of the fold $c$, is turned over onto the flap $e$ and fold $d$; then the fold $b$ is folded over against the surface of the flap $f$, to which it is caused to adhere by suitable adhesive material, as paste or glue. The auditor's receipt is now concealed from inspection by the envelop so formed. The fold $a$ is then folded upon the other folds, and the value-indicating figures thereon will register with the corresponding figures on the invisible auditor's check.

The conductor upon collecting a cash fare punches through all of the folds at a point indicating on the passenger's receipt the amount collected. He tears off the passenger's receipt and gives it to him. After the conductor has been through a car and collected the fares it is practically impossible for him to determine how much is charged against him by the punches in these invisible auditor's checks. Of course if the value-indicating figures occupied always the same position upon all of the receipts he could determine from the position of the punch-hole through the envelop what each punch-mark indicated. As above stated, however, the figures are arranged differently on different tickets. In Figs. 1, 2, and 4 is a ticket No. 412, whereon the figures are arranged in a natural order, with the smallest value at the top. On ticket No. 413 (shown in Fig. 3) the value of indicating-figures are arranged in the reverse order. The different arrangements on different tickets may be multiplied to any extent desired. When the different tickets are so differentiated, it is obviously impossible for the conductor by merely inspecting the punched envelops which remain in his hands to determine what values on the inclosed auditor's checks those punch-marks indicate. It is therefore practically impossible for the conductor without detection to first tear off the passenger's receipt and punch it and then independently punch the auditor's check at a point indicating a smaller value. The only way this could be done with any certainty that the punch-mark through the envelop would cut a figure on the auditor's check representing a smaller value would be to independently punch the ticket and the envelop in the presence of the passenger. The result of the use of these tickets is that the conductor, not knowing how much he is charged with by these concealed auditor's checks, will at the end of the run turn in to the cashier all of the money he has in his possession less the amount he started with when he began his run. He will also turn in to the auditor the punched envelops containing the concealed auditor's checks. In the lower edge of the envelops are finger-notches $j$. The auditor, with a paper-knife inserted through these notches, cuts the connection between the auditor's check and the fold $c$ and pulls out the check, which, as above stated, will be punched at a point corresponding with that at which the duplicate passenger's ticket was punched.

It is apparent that the gist of this invention is not dependent upon the particular manner of construction or folding a blank, but that the invention includes any and all duplicated receipts which include an auditor's check, means for concealing it from the inspection of the conductor, and the duplicate receipt arranged so that the value figures thereon register with the corresponding figures on the auditor's check.

Having described my invention, I claim—

1. A book or pad of receipts, consisting of members $d$ whereon are a series of numbers, and alternately-placed members $a$ whereon are a duplicate set of numbers which register with corresponding numbers on the members $d$, said numbers being the same on all receipts, but being differently arranged on different receipts, and means for concealing the numbers upon the members $d$.

2. A duplicate receipt consisting of a sheet of paper folded to make four folds, of which two folds are provided with duplicate sets of numbers which occupy registering relations when the blank is folded, and the two other folds are secured together over one of the folds first named so as to conceal the numbers thereon from inspection.

3. A duplicate receipt consisting of a sheet of paper folded to form four folds $a$, $b$, $c$, and $d$, of which the first three are connected with each other along their side edges, and the fourth is connected with one of the others along the lower edge of the latter, the folds $a$ and $d$ having duplicate figures which, when the paper is folded as stated register with each other, and the folds $b$ and $c$ being sealed together to form an envelop around the fold $d$.

4. A duplicated receipt consisting of a sheet of paper folded to form four folds $a$, $b$, $c$, and $d$, of which the first three are connected with each other along their side edges, and the fourth is connected with one of the others along the lower edge of the latter, the folds $a$ and $d$ having duplicate figures which when the paper is folded as stated register with each other, and the folds $b$ and $c$ being sealed together to form an envelop around the fold $d$, and having in their lower edges finger-notches.

5. A duplicated receipt consisting of a sheet of paper folded to form four folds $a$, $b$, $c$ and $d$, of which the three former are connected together along their side edges and the fold $d$ is connected with one of the other folds along the lower edge of the latter, the fold $c$ having also at its top edge a flap $e$ which after fold $d$ has been turned up onto fold $c$ is folded down upon the said fold $d$, and said fold $c$ having also a flap $f$ along its side edge which, when fold $b$ is folded over along the line joining it with the fold $c$ is pasted to said flap $f$.

6. A book or pad of pairs of receipts, each of which pairs consists of a member $d$, on which is a series of symbols, and a superposed member $a$ whereon is printed a series of numbers which respectively register with corresponding symbols on the member $d$, the same numbers being used on all members $a$ but being differently arranged on different members $a$.

7. A book or pad of pairs of paper members $a$ and $d$, whereof each of the members $a$ has on its face a series of numbers which are the same on all of said members $a$, but are differently arranged on different members $a$, said members being arranged alternately in a book or pad whereby it is possible to punch a hole simultaneously through corresponding parts of both members.

In testimony whereof I hereunto affix my signature in the presence of two witnesses.

MAURICE C. FLAHAVAN.

Witnesses:
E. L. THURSTON,
ALBERT H. BATES.